United States Patent

[11] 3,604,662

| [72] | Inventors | Harold E. Nelson, Jr.<br>Chula Vista;<br>Ralph O. Brannon, La Mesa, both of, Calif. |
|---|---|---|
| [21] | Appl. No. | 3,727 |
| [22] | Filed | Jan. 19, 1970 |
| [45] | Patented | Sept. 14, 1971 |
| [73] | Assignee | Rohr Corporation<br>Chula Vista, Calif. |

[54] THRUST-REVERSING APPARATUS FOR JET-PROPELLED AIRCRAFT
4 Claims, 5 Drawing Figs.

[52] U.S. Cl. .................................................. 244/53 R,
60/230, 239/265.29, 239/265.37, 244/110 B
[51] Int. Cl. ....................................................... B64c 15/06
[50] Field of Search ............................................ 244/52, 53
R, 110 B; 239/265.29, 265.31, 265.33, 265.35,
265.37; 60/229, 230, 232, 226 A

[56] References Cited
UNITED STATES PATENTS

| 2,943,444 | 7/1960 | Baxter .......................... | 239/265.17 |
| 2,968,150 | 1/1961 | Goebel et al. .................. | 239/265.37 |
| 3,164,956 | 1/1965 | Colebrook et al. ............ | 239/265.37 |
| 3,532,275 | 10/1970 | Hom et al. ..................... | 239/265.33 |
| 3,550,855 | 12/1970 | Feld et al. ..................... | 239/265.29 |

Primary Examiner—Milton Buchler
Assistant Examiner—Jeffrey L. Forman
Attorneys—Edwin D. Grant and George E. Pearson ABSTRACT: Each of a pair of thrust-reversing doors is connected to an aircraft jet-engine housing by six links, two of which pivot about a first axis disposed transverse to the longitudinal axis of the housing, two of which pivot about an axis disposed laterally of said first axis and parallel therewith, and two of which are connected with drive means associated with the housing.

INVENTOR.
HAROLD E. NELSON, JR.
RALPH O. BRANNON

BY Edwin D. Grant
ATTORNEY

INVENTOR.
HAROLD E. NELSON, JR.
RALPH O. BRANNON
BY Edwin D. Grant
ATTORNEY

THRUST-REVERSING APPARATUS FOR JET-PROPELLED AIRCRAFT

SUMMARY OF THE INVENTION

This invention relates to jet-propelled aircraft and, more particularly, to thrust-reversing apparatus for such aircraft.

The engine housings of many jet-propelled aircraft are provided with pairs of panels, or doors, which are mounted for movement between a stowed position wherein they extend axially of a housing and close gaps between wall sections disposed in diametrically opposed relation at the aft end of the latter, and a deployed position wherein they extend transversely across the flow path of exhaust gas issuing from the housing and deflect said gas laterally and forwardly through the aforesaid gaps. In some aircraft such doors are mounted on the wall of an engine housing by means of pivot pins, which mounting arrangement permits only rotation of the doors about an axis transverse to the longitudinal axis of the housing. In some instances, however, it is desirable to connect thrust-reversing doors to an engine housing in such manner that the doors move a greater distance in the downstream direction, when deployed, than is possible to attain by rotation of the doors about pivot pins. A required translation of thrust-reversing doors in the downstream direction during their deployment can be achieved by connecting the same to an engine nacelle by means of the linkage arrangement commonly referred to in the art as a four-bar linkage. However, previously known arrangements for mounting doors to an engine housing by means of links are disadvantageous in that they are not capable of being rapidly and economically adjusted or modified to vary the extent of downstream translation of the doors during their deployment, which change in translation may be necessary because of modification of other components of the power plant assembly or improvement of design after testing programs have been conducted.

In thrust-reversing apparatus constructed in accordance with the principles of the present invention a pair of thrust-reversing doors are mounted on an engine housing so that the distance which they translate in the downstream direction, when moved from the stowed to deployed position, can readily be varied without materially changing the doors or the structure of their supporting housing. In a preferred embodiment of the invention two narrow sidewalls are attached in diametrically opposed relation on, and project rearwardly from, the aft end of an aircraft jet-engine housing. At the aft end of each sidewall is a support plate to which the ends of four links are pivoted, namely, a pair of first links which rotate about a first axis disposed transverse to the longitudinal axis of said housing and a pair of second links which respectively rotate about axes disposed parallel to said first axis and situated on opposite sides thereof in the direction transverse to said longitudinal axis. Two generally hemicylindrical thrust-reversing doors are formed so that their side edges respectively abut the longitudinally edges of the sidewalls when the doors are in a stowed position, the sidewalls and doors together forming a tubular extension of the housing through which exhaust gas of the engine within said housing is discharged. Extending along the aft portion of each side edge of the doors is a mounting plate, the free end of a respective one of the first links on each sidewall being pivoted to the aft end of a respective one of these plates while the free end of a respective on of the second links on said sidewall is pivoted to the forward end thereof. Drive links are respectively pivoted to the side edges of the doors forward of the mounting plates and are connected to drive means associated with the housing, said drive means being simultaneously operable to move the drive links rearwardly and thereby swing the doors about the support plates to a position wherein their aft edges are in abutment and the doors intercept the exhaust gas and deflect the same outwardly and forwardly.

DETAILED DESCRIPTION

Figure 1:
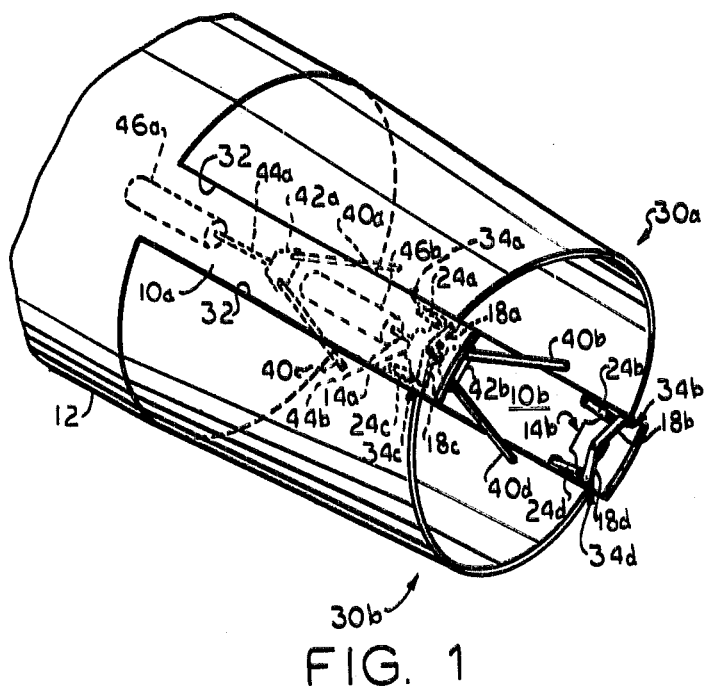
FIG. 1 is a pictorial view of the aft portion of an aircraft jet-engine housing provided with thrust-reversing apparatus in accordance with this invention, a pair of thrust-reversing doors of said apparatus being illustrated in a retracted position wherein they are disposed against the aft end of said housing.
Figure 2:
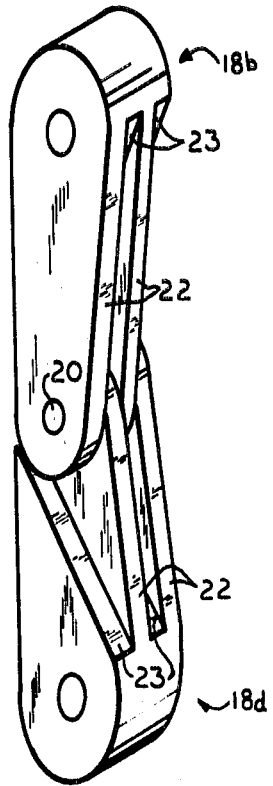
FIG. 2 is an enlarged view of links which are pivoted to the aft end of each of two sidewalls which are illustrated in FIG. 1.

As illustrated in FIGS. 1 and 2, in one embodiment of the invention a pair of elongate sidewalls 10a, 10b are fixedly attached to, and extend rearwardly from, the aft end of a tubular housing 12 which envelops a jet engine (not shown) and which may be either the fuselage or an engine nacelle of a jet-propelled aircraft. Fastened to the inner surface of each sidewall at the aft end thereof is a support plate, the two plates being respectively generally designated by the numbers 14a, 14b and each being formed with projections 16a, 16b which extend laterally from opposite sides of the longitudinal axis of the associated sidewall (see also FIGS. 4 and 5). The ends of two first links 18a–18d are pivoted to each support plate by means of a pin 20, the longitudinal axis of the pin on support plate 14a being coincident with that of the pin on support plate 14b so that said first links rotate about a first axis disposed transverse to, and intersecting, the longitudinal axis of housing 12. As can be seen in FIG. 2, the associated pairs of first links are formed with interlocked fingers 22 and their sides are coplanar. The ends of two second links 24a–24d are also respectively pivoted to the lateral projections on each support plate 14a, 14b by means of pins 26, 28. More specifically, the longitudinal axis of the pin 26 on support plate 14a is coincident with that of the pin 26 on support plate 14b so that second links 24a, 24b rotate about a second axis disposed parallel to, and spaced laterally from, the aforesaid first axis, and the longitudinal axis of the pin 28 on support plate 14b so that second links 24c, 24d rotate about a third axis also disposed parallel to the first axis and spaced laterally therefrom on the side thereof opposite said second axis.

Figure 4:
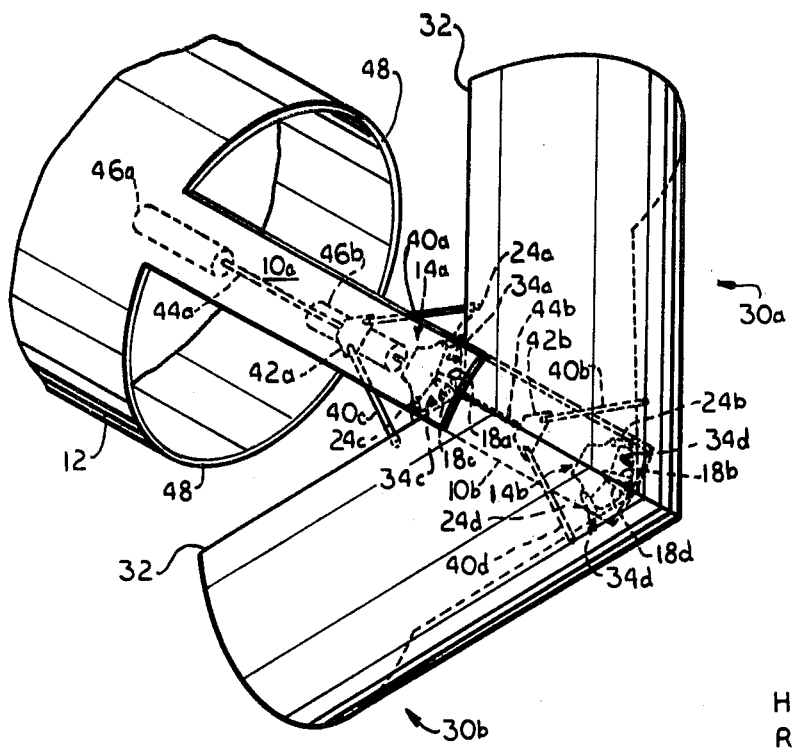
FIG. 4 is another pictorial view of the housing, taken from the viewpoint of FIG. 1 and illustrating the doors in a deployed position.
Figure 3:
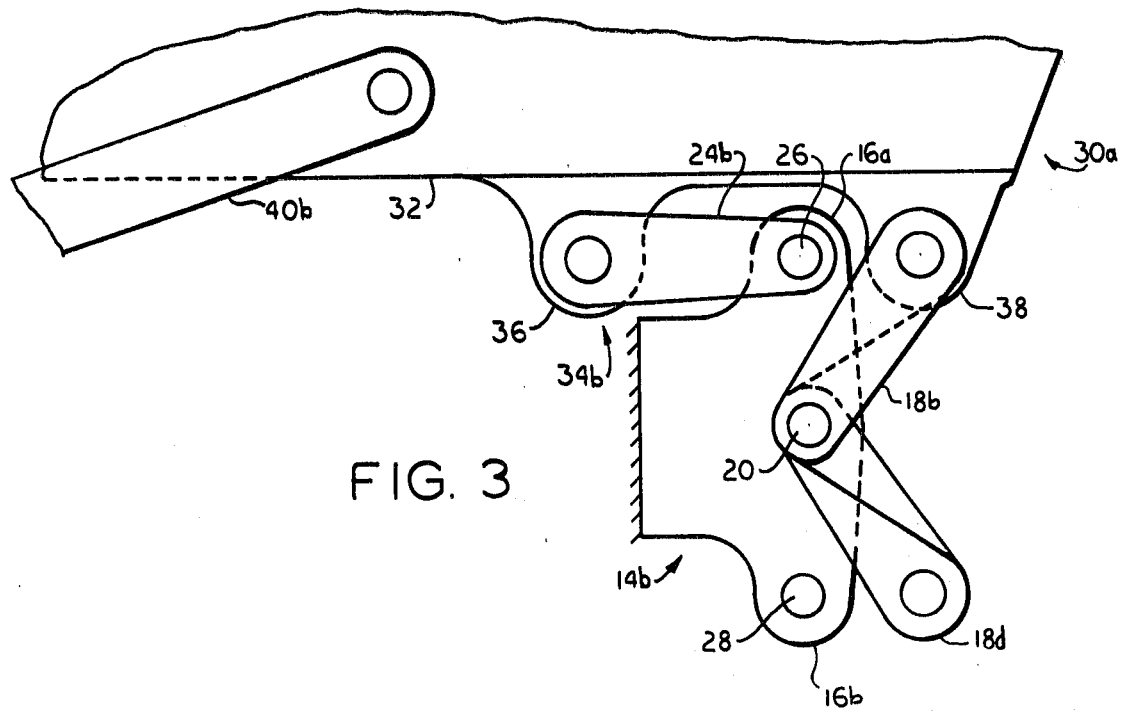
FIG. 3 is a fragmentary side elevation of components of the same apparatus, illustrating their orientation in the stowed position of the doors.

FIGS. 1 and 4 illustrate two arcuate thrust-reversing doors which are respectively generally designated 30a, 30b and each side edge 32 of which has an elongate mounting plate fastened to the aft end thereof, these plates being generally designated 34a–34 and each comprising laterally extending projections 36, 38 (see also FIG. 3). The free ends of first links 18a, 18b (i.e., the ends of said links which are not connected to support plates 14a, 14b) are respectively pivoted to the rear projections 38 of the mounting plates 34a, 34b on door 30a for rotation about an axis parallel to the aforesaid first axis, and the free ends of first links 18c, 18d are respectively pivoted to the rear projections 38 of the mounting plates 34c, 34d on door 30b. Similarly, the free ends of second links 24a, 24b are respectively pivoted to the forward projections 36 of the mounting plates 34a, 34b on door 30a for rotation about an axis parallel to the first axis, and the free ends of second links 24c, 24d are respectively pivoted to the forward projections 36 of the mounting plates 34c, 34d on door 30b for rotation about another axis parallel to said first axis. Four drive links 40a–40 are respectively pivoted at one end thereof to the side edges of the doors at points spaced forward of the respective mounting plates 34a–40d, and the other ends of these links are pivoted to a respective one of two triangular frames 42a, 43b which in turn are respectively mounted on the drive shafts 44a, 44b of actuators 46a, 46b secured to the inner surface of housing 12 on opposite sides thereof.

OPERATION

Actuators 46a, 46b are arranged so that they can be simultaneously operated to move shafts 44a, 44b and frames 42a, 42b from the forward position thereof which is illustrated in FIG. 1 to the downstream position thereof which is illustrated in FIG. 4, thereby swinging doors 30a, 30b from the stowed position wherein their side edges 32 respectively abut the longitudinally extending edges of sidewalls 10a, 10b and their forward edges abut the aft edge 48 of housing 12, to the deployed position wherein the doors are disposed transverse to the longitudinal axis of said housing and their aft edges abut each other. The included angle between the side edges and the aft edge of each door is obtuse so that the doors are inclined slightly in the upstream direction when deployed, and thus exhaust gas which at this time impinges on the doors in deflected both laterally and forwardly relative to the housing. Obviously the actuators can be operated in the reverse direction to return the doors to the stowed position. Means such as limit switches (not shown) are provided to stop the operation of the actuators when the doors reach both the deployed or stowed position.

Figure 5:
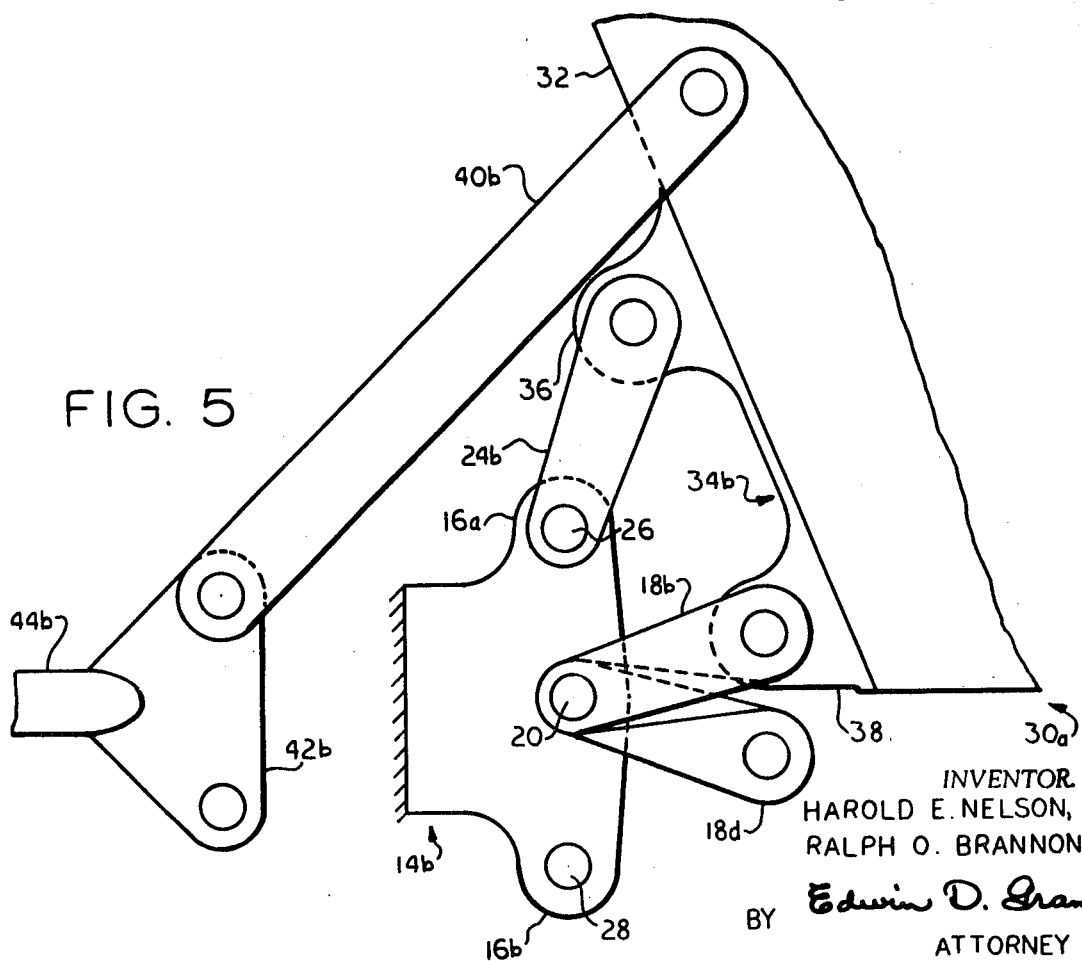
FIG. 5 is a fragmentary side elevation of the components shown in FIG. 3, illustrating their orientation in the deployed position of the doors.

It will be apparent by examination of FIGS. 3 and 5 that the extent of translation of doors 30a, 30b in the downstream direction during their deployment can be varied by changing the lengths of the links which connect said doors to sidewalls 10a, 10b, and by using different support plates 14a, 14b and mounting plates 34a–34d which cooperate with the selected links to position the doors against the longitudinally extending edges of said sidewalls and the aft edge of the housing when the doors are stowed. The arrangement of the links, support plates, and mounting plates also provides a compact mechanism for mounting thrust-reversing doors on an aircraft jet-engine housing, even though six links are used to support each door instead of four as in most of the known linkage-type thrust-reversing systems.

Although this invention has been described with reference to a particular embodiment of same, it should not be limited thereto for various changes and modifications could be made by one having ordinary skill in the art without departing from the spirit and scope of this invention as defined in the following claims.

What is claimed as new and useful and desired to be secured by U.S. Letters Patent is:

1. In combination with an aircraft jet-engine housing, thrust-reversing apparatus comprising an arcuate thrust-reversing door, a pair of first links pivoted at one end thereof to said housing for rotation about a first axis disposed transverse to the longitudinal axis of the latter, said first links being spaced apart on said first axis and their free ends being respectively pivoted to the side edges of said door adjacent the aft end thereof so that the door is rotatable relative to said first links about an axis substantially parallel to said first axis, a pair of second links pivoted at one end thereof to said housing for rotation about a second axis disposed substantially parallel to said first axis and situated laterally therefrom, said second links being spaced apart on said second axis and their free ends being respectively pivoted to the side edges of said door at points spaced forward from the points where said first links are connected thereto so that the door is rotatable relative to said second links about an axis substantially parallel to said first axis, a pair of drive links respectively pivoted at one end thereof to the side edges of said door at points spaced forward from the points where said second links are connected thereto, and drive means operatively associated with said housing and respectively connected to the other ends of said drive links, said drive means being simultaneously operable to thereby move said door between stowed and deployed positions wherein the side edges thereof are respectively disposed axially of, and lateral to, the longitudinal axis of said housing.

2. In combination with a tubular aircraft jet-engine housing, thrust-reversing apparatus comprising a pair of elongate walls attached to and projecting rearwardly from the aft end of said housing and disposed in diametrically opposed relation relative thereto, four first links pairs of which are respectively pivoted at one end thereof to each wall for rotation about a first axis disposed transverse to the longitudinal axis of said housing, a pair of arcuate thrust-reversing doors the aft ends of the side edges of each of which are respectively pivoted to the free ends of two of said first links which are connected to different walls, the axes of rotation of said doors relative to the first links connected therewith being substantially parallel to said first axis, four second links pairs of which are respectively pivoted at one end thereof to each wall for rotation about axes disposed substantially parallel to said first axis and situated on opposite sides thereof, the free ends of two second links which are connected to different walls being respectively pivoted to the side edges of the respective doors at points spaced forward from the points where said first links are connected thereto so that the doors are rotatable relative to the second links connected therewith about axes substantially parallel to said first axis, and four drive links respectively pivoted at one end thereof to the side edges of said doors at points spaced forward of the points where said second links are connected thereto, and drive means operatively associated with said housing and respectively connected to the other ends of said drive links, said drive means being simultaneously operable to thereby move said doors between a stowed position wherein the side edges thereof are respectively disposed alongside the longitudinal edges of said walls and a deployed position wherein the side edges thereof are lateral to the longitudinal axis of said housing.

3. Apparatus as defined in claim 2 wherein the first and second links connected to said sidewalls are respectively pivoted to support plates removably attached to the latter.

4. As as defined in claim 2 wherein the first and second links connected to said doors are respectively pivoted to mounting plates removably attached to the side edges of the latter.